United States Patent [19]

Schutten et al.

[11] Patent Number: 4,706,183
[45] Date of Patent: Nov. 10, 1987

[54] BRIDGE-TYPE FREQUENCY MULTIPLIER

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corporation, Cleveland, Ohio

[21] Appl. No.: 402,862

[22] Filed: Jul. 29, 1982

[51] Int. Cl.$^4$ .............................................. H02M 5/02
[52] U.S. Cl. .................................... 363/157; 363/163; 363/177
[58] Field of Search ....................... 363/9-12, 363/157, 159, 160, 161, 163, 166, 169, 177; 318/768, 800, 807

[56] References Cited

U.S. PATENT DOCUMENTS 2,342,676  2/1944  Lewis .................................. 363/169

FOREIGN PATENT DOCUMENTS 2515857  2/1976  Fed. Rep. of Germany ...... 363/160
25925    7/1972  Japan ................................... 363/160
1077987  8/1967  United Kingdom ................ 363/160

OTHER PUBLICATIONS

"Static Power Frequency Changers", Guygui and Pelly, John Wiley & Sons, N.Y., 1976.

Primary Examiner—William H. Beha, Jr.
Attorney, Agent, or Firm—Andrus, Sceales, Starke & Sawall

[57] ABSTRACT

An AC frequency conversion technique is disclosed using an H-switch toggled at irregular times to yield a chopped sinusoid output waveform of a given fundamental frequency. The irregular switching pattern is a departure from the classical cycloconverter frequency conversion approach. The H-switch is connected between a pair of power lines L1 and L1 and alternately switched between one and another ON state at any point in the AC cycle to yield any up-converted or down-converted output frequency of the chopped sinusoid output waveform. The output waveform has a positive half cycle during which the H-switch is in one ON state when L1 is positive with respect to L2 and is in the other ON state when L2 is positive with respect to L1. The output waveform has a negative half cycle during which the H-switch is in the one ON state when L1 is negative with respect to L2 and is in the other ON state when L2 is negative with respect to L1.

10 Claims, 4 Drawing Figures

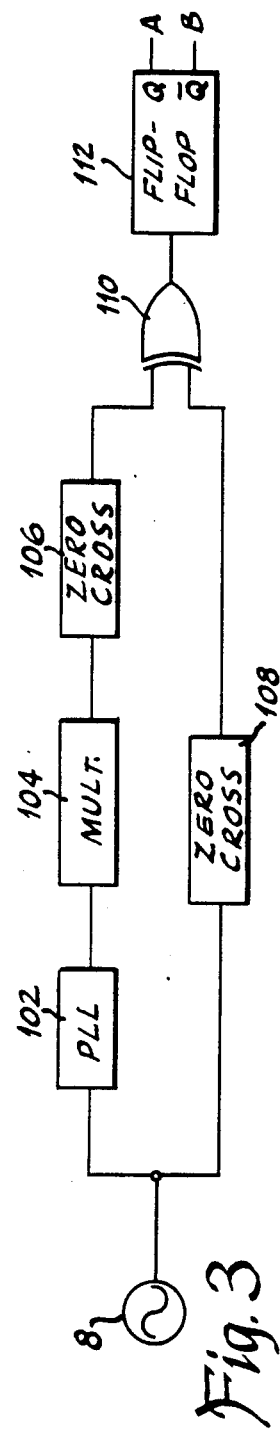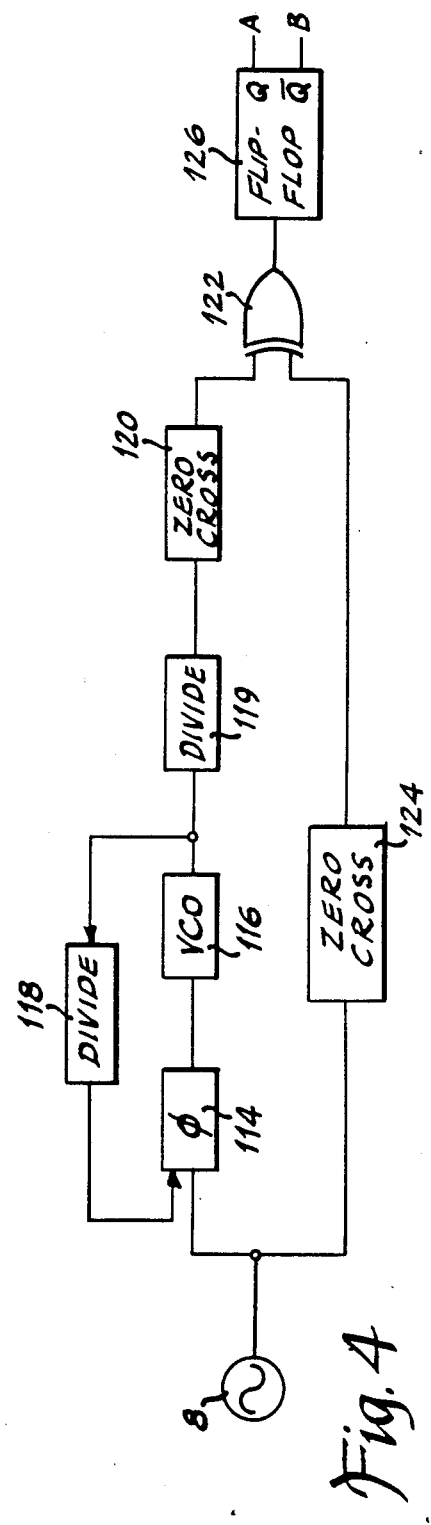

4,706,183

BRIDGE-TYPE FREQUENCY MULTIPLIER

BACKGROUND AND SUMMARY

The use of an H-switch in AC frequency conversion is known. In one type of single phase cycloconverter, an H-switch connects a load to a pair of AC power lines L1 and L2 supplied by an AC source. The H-switch has one ON state connecting L1 to the left end of the load and connecting L2 to the right end of the load. The H-switch has another ON state connecting L2 to the left end of the load and connecting L1 to the right end of the load. The H-switch module has four switches, one pair of which is closed for the one ON state, and the other pair of which is closed for the other ON state.

In a typical cycloconverter, the H-switch is switched between its two ON states at a specific periodic frequency which mixes with the incoming frequency of the AC signal in heterodyning relation to yield various output frequencies, analogously to side bands. For example, mixing a 60 hertz input AC signal with a 132 hertz timing switching signal to the H-switch results in a plurality of output frequencies, including a 72 hertz output frequency, a 192 hertz output frequency, a 336 hertz output frequency and so on, *Static Power Frequency Changers,* Gyugyi and Pelly, John Wiley & Sons, N.Y., 1976.

The present invention departs from the classical cycloconverter approach and instead uses an irregular timing switching signal to toggle the H switch between its two ON states. This irregular timing of H-switch switching yields a chopped sinusoid output waveform of a given fundamental frequency.

In the classical cycloconverter approach, during a given half cycle of the output frequency, the output waveform may be constituted by a plurality of segments of both positive and negative polarity, for example the above noted Gyugyi reference, pages 56, 57 and 168. In contrast, in the present invention the output waveform in any half cycle is constituted by segments of common polarity.

In preferred form, the H-switch is toggled in response to a given frequency clock signal and is also toggled in response to each zero crossing of the input AC signal except when a zero crossing and a clock signal coincide in time.

The invention is particularly useful for up conversion in certain motor control applications, specifically where an increase in frequency is desired for only short periods of time compared with normal lower frequency run-time. An example is refrigeration control where the compressor must be designed for the worst case situation even though such worst case occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cooldown time. This faster speed operation is not detrimental to the compressor for short periods of time.

In the present invention, the AC frequency may be increased in a simple manner for running the compressor at a faster speed. A trade off in the present frequency conversion technique is that the resultant chopped sinusoid output waveform of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

BRIEF DESCRIPTION OF THE DRAWINGS

FIG. 3 is a schematic circuit diagram illustrating a timing control for providing the timing of FIG. 2.

FIG. 4 is a schematic circuit diagram of another timing control for providing the timing of FIG. 2.

DETAILED DESCRIPTION

Figure 1:
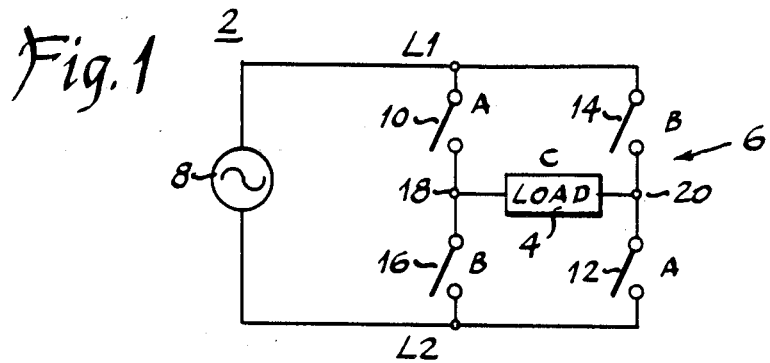
FIG. 1 is a schematic circuit diagram for illustrating the AC frequency conversion technique of the present invention.

FIG. 1 shows an AC circuit 2 having a load 4 connected by an H-switch 6 to a pair of power lines L1 and L2 having an AC signal supplied by AC source 8. This circuit may be used as a single phase cycloconverter and is well known.

H-switch 6 has four switches 10, 12, 14 and 16. H-switch 6 has one ON state A in which switches 14 and 16 are open and switches 10 and 12 are closed such that L1 is connected to the left end of load 4 at point 18 and L2 is connected to the right end of load 4 at point 20. H-switch 6 has another ON state B in which switches 10 and 12 are open and switches 16 and 14 are closed such that L2 is connected to the left end 18 of load 4 and L1 is connected to the right end 20 of load 4.

Figure 2:
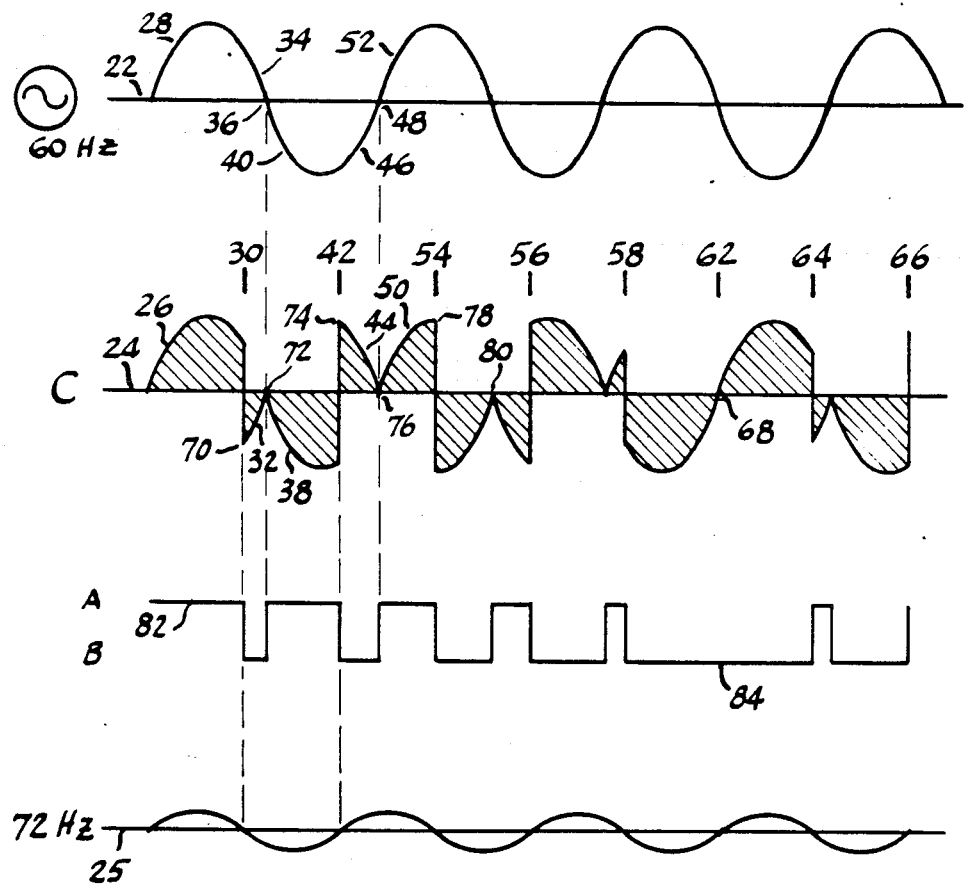
FIG. 2 is a timing diagram illustrating operation of the circuit of FIG. 1 in accordance with the invention.

In the present invention, H-switch 6 is alternately switched between ON states A and B at irregular times to yield a switched output waveform of a given fundamental frequency. Timing line 22 in FIG. 2 shows the AC input signal from source 8, for example 60 hertz. Timing line 24 shows a chopped sinusoid output waveform C through load 4. The fundamental frequency of waveform C in this example is shown on line 25 and is 72 hertz. The H-switch is initially in its one ON state A such that the output waveform at C has a positive segment 26 which tracks a positive segment 28 of the input AC signal from L1. At a clock signal at time 30, H-switch 6 is toggled to switch to its other ON state B, resulting in output waveform segment 32 which tracks the remainder segment 34 of the first half cycle wave segment on L1 but in the reverse direction through load 4.

At zero crossing 36, the H-switch toggles again to switch back to its one ON state A, resulting in output waveform segment 38 which tracks like-going negative wave segment 40 on L1. At the next clock signal at time 42, the H-switch is again toggled to transition to its other ON state B, resulting in output waveform segment 44 which is the inversion of waveform segment 46 of the input AC signal. At zero crossing 48, the H-switch is again toggled to its A state, resulting in output waveform segment 50 which tracks in like-going relation waveform segment 52 of the AC input signal.

In the example given, a 144 hertz clock signal is used, such that the clock signal occurs at times 30, 42, 54, 56, 58, 62, 64, 66, etc. H-switch 6 is toggled between its two ON states A and B in response to each clock signal, and is also toggled between states A and B in response to each zero crossing of the AC signal except when a zero crossing and a clock signal coincide in time, as shown at 68. The chopped sinusoid output waveform C has an inflection point at each toggled transition between ON states A and B of the H-switch, as shown at inflection points 70, 72, 74, 76, 78, 80, etc.

Output waveform C has a positive half cycle during which the H-switch is switched to the one ON state A when L1 is positive with respect to L2 and is switched to the other ON state B when L2 is positive with respect to L1. Output waveform C has a negative half cycle during which the H-switch is switched to the one ON state A when L1 is negative with respect to L2 and switched to the other ON state B when L2 is negative with respect to L1. For example, during the negative half cycle of output waveform C provided by segments 32 and 38, H-switch 6 is switched to its ON state B for segment 32 and to its ON state A for segment 38. For the positive half cycle in waveform C provided by segments 44 and 50, H-switch 6 is switched to its ON state B for segment 44 and to its ON state A for segment 50.

Timing signal 82 shows the irregular switch timing for toggling H-switch 6 between states A and B. A toggled transition of the H-switch occurs at each clock signal and at each zero crossing of the input AC signal except when they coincide, as shown at 84 where no transition has occurred. One manner of implementing this irregular timing control is by exclusively ORing the clock signal and the zero crossings of the input AC signal to toggle the H-switch between states A and B.

FIG. 3 shows one form of implementation, wherein a phase lock loop 102 extracts the frequency of AC source 8, which frequency is multiplied by a clock multiplier 104, such as a frequency synthesizer, and output to a zero crossing detector 106, whose output provides the given frequency clock signal. In the example in FIG. 2, the given multiple for multiplier 104 is 6/5. Zero crossings of the AC input signal are detected by zero crossing detector 108 and delivered to one input of an exclusive OR gate 110, whose other input is supplied by the clock signal provided by the given multiple of AC input signal zero crossings. The output of gate 110 toggles flip-flop 112 between its Q and $\overline{Q}$ outputs to switch H-switch 6 between ON states A and B.

FIG. 4 shows another timing control wherein the phase detector 114 and the voltage controller oscillator 16 of the phase lock loop have a feedback divider 118, such as a counter, from the output of VCO 116 to the input of phase detector 114. As is known, if divider 118 performs a divide by 6 operation, then the output of VCO 116 will have a frequency 6 times as great as the input from source 8. The output of VCO 116 is delivered to a divider 119 which in the above example performs a divide by 5 operation, such that the output of divider 119 is 5 as great as the AC input frequency from source 8. The output of divider 119 is delivered to zero crossing detector 120, whose output is the given frequency clock signal to one input of exclusive OR gate 122. The other input of gate 122 is supplied from zero crossing detector 124 from AC source 8. The output of gate 122 toggles flip-flop 126 between states A and B.

While the 60 hertz input AC line frequency and the 72 hertz output frequency have been given as examples, it is readily appreciated that other fractional frequency changes are within the scope of the invention. For example, in FIG. 4 divider 118 provides the numerator and divider 119 privides the denominator of the frequency change fraction. Furthermore, it is not necessary that H-switch 6 be controlled by some fraction of AC line frequency. For example, the switch can be toggled at a variable frequency rate.

It is recognized that various modifications are possible within the scope of the appended claims.

We claim:

1. In an AC circuit having a load connected by an H-switch to a pair of power lines L1 and L2 supplied by an AC soruce, said H-switch having one ON state connecting L1 to the left end of said load and connecting L2 to the right end of said load, said H-switch having another ON state connecting L2 to the left end of said load and connecting L1 to the right end of said load, a frequency conversion technique comprising alternately switching said H-switch between said one and said other ON states by first stitching to said one ON state and then switching to said other ON state and then switching back to said one ON state and so on at irregular times at any point in the Ac cycle to yield a chopped sinusoid switched output waveform of any up-converted given output fundamental frequency.

2. In an AC circuit having a load connected by an H-switch to a pair of power lines L1 and L2 supplied by an AC soruce, said H-switch having one ON state connecting L1 to the left end of said load and connecting L2 to the right end of said load, said H-switch having another ON state connecting L2 to the left end of said load and connecting L1 to the right end of said load, a frequency conversion technique comprising alternately switching said H-switch between said one and said other ON states at irregular times to yield a switched output waveform of a given fundamental frequency, wherein said switched output waveform comprises a chopped sinusoid, and comprising toggling said H-switch between said one and said other ON states in response to a given frequency clock signal and also toggling said H-stitch between said one and said other ON states in response to each zero crossing of the AC signal from said source except when said zero crossing and said clock signal coincide in time.

3. The invention according to claim 2 wherein said chopped sinusoid output waveform has an inflection point at each toggled transition between said one and said other ON states of said H-switch.

4. The invention according to claim 3 comprising exclusively ORing said clock signal and said zero crossings of said AC signal to toggle said H-switch.

5. In an AC circuit having a load connected by an H-switch to a pair of power lines L1 and L2 supplied by an AC source, said H-switch having one ON state connecting L1 to the left end of said load and connecting L2 to the right end of said load, said H-switch having another ON state connecting L2 to the left end of said load and connecting L1 to the right end of said load, a frequency conversion technique comprising alternately switching said H-switch between said one and said other ON states at irregular times to yield a switched output waveform of a given fundamental frequency, wherein said switched output waveform comprises a chopped sinusoid, and comprising toggling said H-switch between said one and said other ON states at a given multiple of AC input signal zero crossings of said AC source and also toggling said H-switch between said one and said other ON states in response to each zero crossing of the AC input signal from said source except when said zero crossing and said given multiple coincide in time.

6. The invention according to claim 5 wherein said chopped sinusoid output waveform has a positive half cycle during which said H-switch is switched to said one ON state when L1 is positive with respect to L2 and switched to said other ON state when L2 is positive with respect to L1, and said chopped sinusoid output waveform has a negative half cycle during which said H-switch is switched to said one ON state when L1 is negative with respect to L2 and switched to said other ON state when L2 is negative with respect to L1.

7. The invention according to claim 6 comprising exclusively ORing said multiple and said zero crossings of said AC signal to toggle said H-switch and provide an inflection point in said chopped sinusoid output waveform at each toggled transition of said H-switch between said one and said other ON states.

8. In an AC circuit having a load connected by an H-switch to a pair of power lines L1 and L2 supplied by an AC source, said H-switch having one ON state connecting L1 to the left end of said load and connecting L2 to the right end of said load, said H-switch having another ON state connecting L2 to the left end of said load and connecting L1 to the right end of said load, a frequency conversion technique comprising alternately switching said H-switch between said one and said other ON states at irregular times at any point in the AC cycle to yield a switched output chopped sinusoid waveform of any given up-converted output fundamental frequency having a positive half cycle during which said H-switch is switched to said one ON state when L1 is positive with respect to L2 and switched to said other ON state when L2 is positive with respect to L1, and having a negative half cycle during which said H-switch is switched to said one ON state when L1 is negative with respect to L2 and switched to said other ON state when L2 is negative with respect to L1.

9. AC frequency conversion apparatus comprising a pair of power lines L1 and L2 supplied with an AC signal from an AC source, an H-switch for connecting a load to L1 and L2, said H-switch having one ON state connecting L1 to the left end of said load and connecting L2 to the right end of said load, said H-switch having another ON state connecting L2 to the left end of said load and connecting L1 to the right end of said load, and including timing means for controlling the toggling of said H-switch between said one and said other ON states such that said H-switch alternately toggles at irregular times at any point in the AC cycle to yield a chopped sinusoid switched output waveform of any given up-converted output fundamental frequency.

10. An AC frequency conversion apparatus comprising a pair of power lines L1 and L2 supplied with an AC signal from an AC source, an H-switch for connecting a load to L1 and L2, said H-switch having one ON state connecting L1 to the left end of said load and connecting L2 to the right end of said load said H-switch having another ON state connecting L2 to the left end of said load and connecting L1 to the right end of said load, and including timing means for controlling the toggling of said H-switch between said one and said other ON states such that said H-switch alternately toggles at irregular times to yield a switched output waveform of a given fundamental frequency, wherein said timing means comprises clock signal means for outputting a clock signal of given frequency, zero crossing detector means for outputting a zero crossed signal in response to each zero crossing of said AC signal, and logic gating means generating a toggling signal to toggle said H-switch in response to each said clock signal and in response to each said zero crossing signal except when said clock signal and said zero crossing signal coincide in time.

* * * * *